United States Patent [19]
Widmaier et al.

[11] Patent Number: 5,162,019
[45] Date of Patent: Nov. 10, 1992

[54] FRESH-AIR INTAKE DUCT FOR A MOTOR VEHICLE

[75] Inventors: Peter Widmaier, Weil der Stadt; Alfred Jeckel, Rottenburg/Neckar; Rolf Köhler, Wildberg, all of Fed. Rep. of Germany

[73] Assignee: Mercedes-Benz AG, Fed. Rep. of Germany

[21] Appl. No.: 810,850

[22] Filed: Dec. 20, 1991

[30] Foreign Application Priority Data

Dec. 21, 1990 [DE] Fed. Rep. of Germany ....... 4041196

[51] Int. Cl.⁵ ............................................. B60H 3/06
[52] U.S. Cl. .................................................. 454/147
[58] Field of Search .............................. 454/146, 147

[56] References Cited

U.S. PATENT DOCUMENTS 2,975,696 3/1961 Jewell ................................. 454/147
3,157,104 11/1964 Nallinger ........................... 454/147
4,819,550 4/1989 Ioka ..................................... 454/147

FOREIGN PATENT DOCUMENTS 3330951 8/1985 Fed. Rep. of Germany.

Primary Examiner—Robert G. Nilson
Attorney, Agent, or Firm—Evenson, Wands, Edwards, Lenahan & McKeown

[57] ABSTRACT

Air-permeable and water-permeable baffles in the form of a fine-meshed grill are mounted in front of the upwardly projecting side walls in a motor vehicle fresh-air intake duct in order to improve separation with an inlet grill retaining any coarse impurities and with at least one drainage aperture, located in the area of the lowest point of the fresh-air intake duct, for liquid separated out from the air current. The liquid making its way through the meshes of the grills flows, in the flow vacuum between baffle and side wall at the back of the baffle, downwards to the duct bottom and the drainage aperture.

6 Claims, 2 Drawing Sheets

FRESH-AIR INTAKE DUCT FOR A MOTOR VEHICLE

CROSS-REFERENCE TO RELATED APPLICATION

This application is related to an application entitled VEHICLE HEATING/AIR-CONDITIONING SYSTEM, filed on Dec. 20, 1991 under Application Ser. No. 07/811,235, in the name of Alfred Jeckel claiming priority of an application filed in Germany with Ser. No. 40 41 195.8 on Dec. 21, 1990.

BACKGROUND AND SUMMARY OF THE INVENTION

The present invention relates to a fresh-air intake duct for a motor vehicle with an inlet grill retaining any coarse impurities and at least one drainage aperture, located in the area of the lowest point of the fresh-air intake duct, for liquid separated out from the air current.

A fresh-air intake duct, with which, even before the inlet grill, drops of liquid separate out in a gutter and with which a residual liquid separate out in a gutter and with which a residual liquid separation is brought about by deflection of the air current, is shown in DE-PS 33 30 951. This liquid separation works with a high degree of efficiency, yet requires, a large amount of construction space and a specified air channel, particularly because of the air deflection. With fresh-air intake ducts orientated in the cross-vehicle direction, such space is not generally available.

An object of the present invention is to provide liquid separation which works with a high degree of efficiency within a fresh-air intake duct without any air deflection and which is thus suitable for use in intake ducts which essentially extend in a straight line.

This object has been achieved, in the case of a fresh-air duct according to the present invention by mounting air-permeable and water-permeable baffles in the form of a fine-meshed grill in front of the upwardly projecting side walls of the fresh air intake duct, and the liquid making its way through the meshes of the grill, in the flow vacuum between a baffles and a side wall at the back of the baffle, to flow away downwards to the duct bottom and to the drainage aperture. The liquid settling at the side is this no longer as before, i.e. in the absence of an air-permeable or water-permeable baffle mounted in front, carried along by the wall current in the direction of flow and, upon becoming detached, finely rescattered. Instead, the liquid accumulating at the back of the baffle is able due to the absence of a directed current, to flow away by gravitational pull downwards to the duct bottom.

A periodically constant distance between the baffle and the duct wall without the use of spacers is achieved if the grill is provided with uniformly continuous-running waves, the wave troughs of which come into contact with the associated side wall of the fresh-air intake duct. Consequently, a flow vacuum is created between two respective wave troughs, in which flow vacuum, on the grill side, liquid is able to flow away downwardly.

In a currently preferred embodiment of the present invention, the wave, viewed in the flow direction of the air, run downwards at an angle of approximately 45°, which is beneficial to the drainage behavior. The wave height advantageously measures approximately 4 mm and the material thickness, in order to obtain good adaptability to variously inclined or variously crooked-running side-wall section, measures approximately 0.3 mm. A mesh width of approximately 1 mm has proved to be particularly effective.

BRIEF DESCRIPTION OF THE DRAWINGS

These and other objects, features and advantages of the present invention will become more apparent from the following detailed descriptions of a currently preferred embodiment when taken in conjunction with the accompanying drawings wherein.

A fresh-air intake duct 1, normally disposed in the cross-vehicle direction of a passenger motor vehicle and sunk between a bonnet and front windscreen in an aggregate area, is covered on the air-intake side by an inlet grill 2 retaining any coarse impurities such as leaves. The fresh-air intake duct 1 has two side walls 3, 4 and a duct bottom linking these together from below. Two drainage apertures 6, 7 for separated water lead off from the duct bottom.

Figure 3:
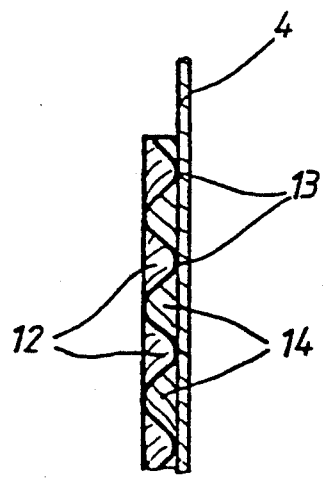
FIG. 3 is a sectional view along line III—III of FIG. 2.

Baffles 8, 9 in the form of grills 10, 11 with a wire thickness of approximately 0.3 mm are mounted, on an area basis, in front of the side walls 3, 4. In the illustrated embodiment, these grills 10, 11 are provided with wave shapes 12 having a wave height of approximately 4 mm and disposed such that the waves 12, viewed in the direction of air flow (arrow A), run downwards at an angle of approximately 45°. The wave troughs 13 of the waves 12 come into contact, as shown in best in FIG. 3, with the associated side wall 3 or 4.

If the fresh air flowing through the inlet grill 2 is laden with moisture, e. g., water, then a large part of this moisture is deposited on the duct bottom 5 and the two side walls 3 and 4. Part of the liquid and, in particular, also any water infiltrating when the vehicle is stationary, is carried away through the drainage aperture 6, while, in the later course of the fresh-air intake duct 1, depositing moisture is led out into the open through the drainage aperture 7 which is located in the area of the duct widening.

Liquid which has separated out on the wall side and which, even before the baffles 8, 9, has settled onto the side wall 3 or 4 is transported by the air current in the direction of the baffles 8, 9 and enters through their grills 10, 11 into flow vacuums 14 at substantially reduced flow compared with the unrestricted duct flow. The flow vacuums 14 are formed at the back of the grills 10, 11 and are bounded, on the one hand, by the waves and, on the other hand, by the side walls 3 or 4. Similarly, moisture carried along on the wall side in the air current enters through the grills 10, 11 into the flow vacuums 14 and is there able to flow away, under gravitational pull, in the direction of the duct bottom 5. As a result of the course of the waves 12, directed downwards at an angle of approximately 45° to the direction of the air current designated by arrow A in FIGS. 1 and 2, the moisture particles entering into the particular flow vacuum 14 receive a downwardly directed component which is beneficial to the drainage behavior.

In this way, moisture which has separated out on the wall side is effectively prevented from not flowing away downwardly, particularly at relatively high air speeds. In addition, it is no longer possible for moisture which has already separated out on the wall side to become detached in the event of wall-rebounds and be carried along by the air current.

Figure 1:
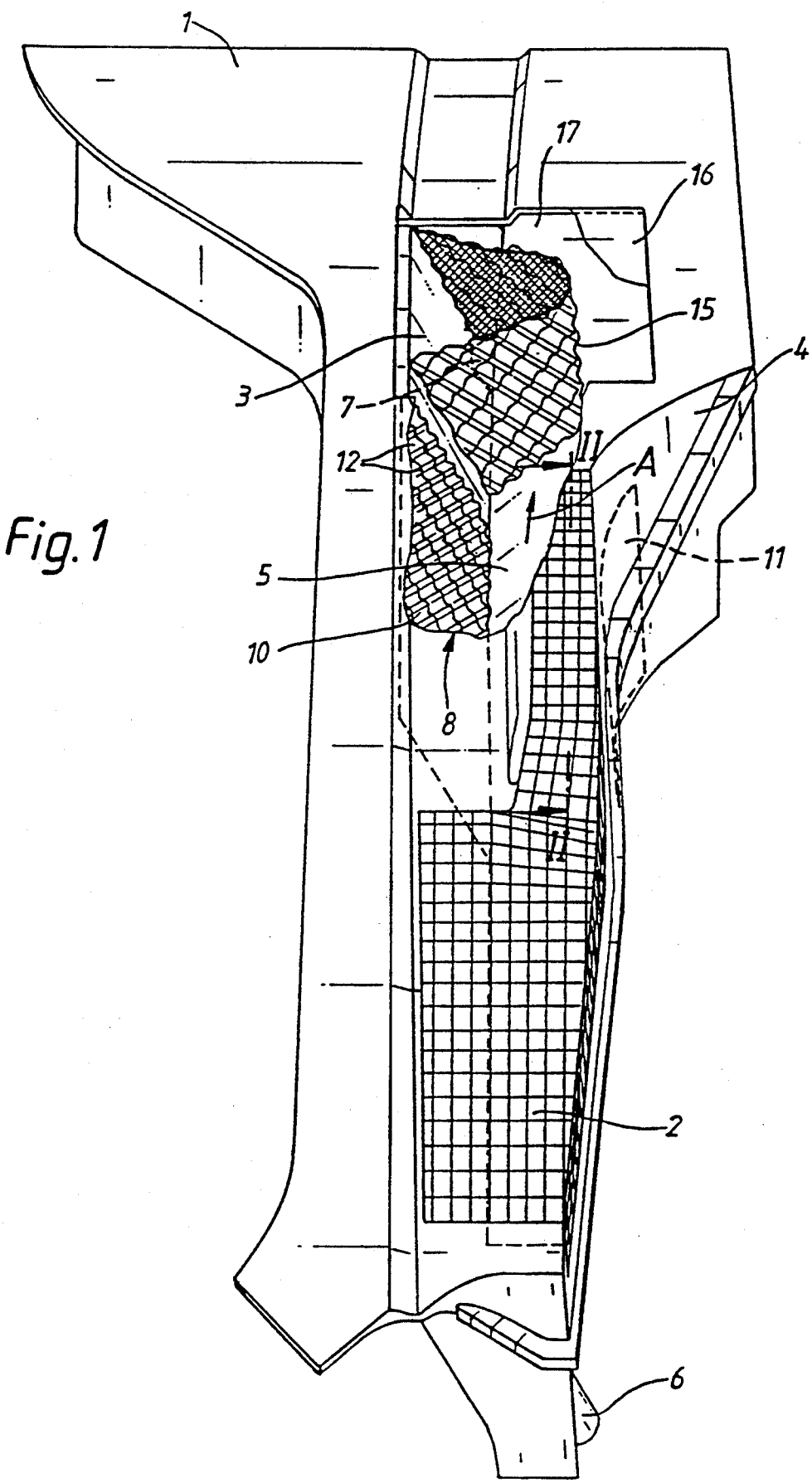
FIG. 1 is a perspective top view of a partially broken-open fresh-air intake duct in accordance with the present invention.
Figure 2:
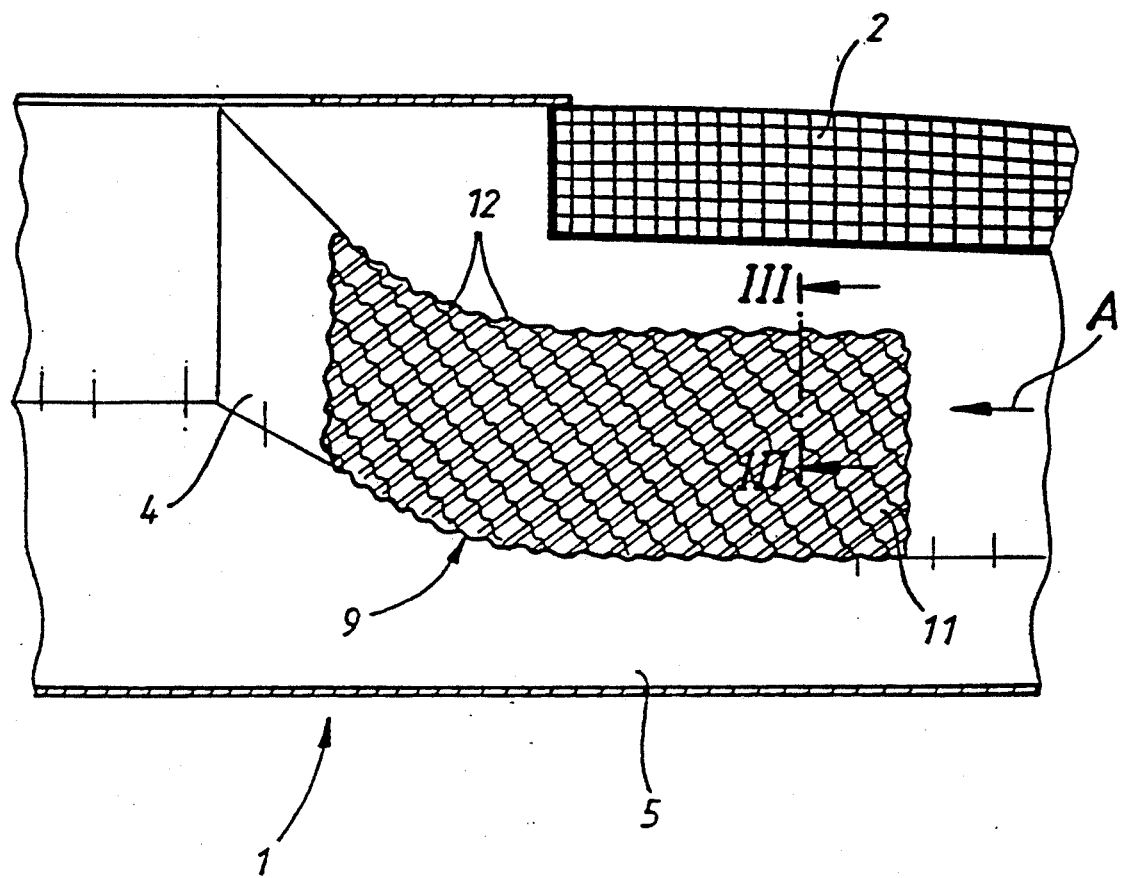
FIG. 2 is a sectional view along line II—II of FIG. 1.

As can also be seen from FIG. 1, the drainage aperture 7 is screened by a guide element 15, standing apart from the side wall 3 and comprising a grill. The guide element 15 deflects a large part of the air flowing against it, with a supplementary water-separating effect, in the direction of the oppositely-located duct widening. Following the removal of lid 16, the guide element can be detached from the fresh-air duct 1 upwardly through an aperture 17, for cleaning or replacement purposes.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. The fresh-air intake duct for a motor vehicle, comprising an inlet grill for retaining any coarse impurities from an air current and at least one drainage aperture, located at a lowest point of the fresh-air intake duct, for liquid separated out from the air current, and air-permeable and water-permeable baffles configured as a fine-meshed grill operatively mounted in front of upwardly projecting side walls of the fresh-air intake duct such that the liquid makes its way through the fine meshes of the grill, in a flow vacuum between the baffles and the side walls at a back portion of the baffles, and flows away downwardly to a duct bottom and to the at least one drainage aperture.

2. The fresh-air intake duct according to claim 1, wherein the grill is configured with uniformly continuous-running waves, having wave troughs that come into contact with the associated side wall of the fresh-air intake duct.

3. The fresh-air intake duct according to claim 2, wherein the waves, viewed in a direction of air flow, run downwards at an angle of approximately 45°.

4. The fresh-air intake duct according to claim 2, wherein a height of the waves measures approximately 4 mm.

5. The fresh-air intake duct according to claim 3, wherein a height of the waves measures approximately 4 mm.

6. The fresh-air intake duct according to claim 1, wherein a thickness of the fine-meshed grill material measures approximately 0.3 mm and a mesh width measures approximately 1 mm.

* * * * *